Figure 1:
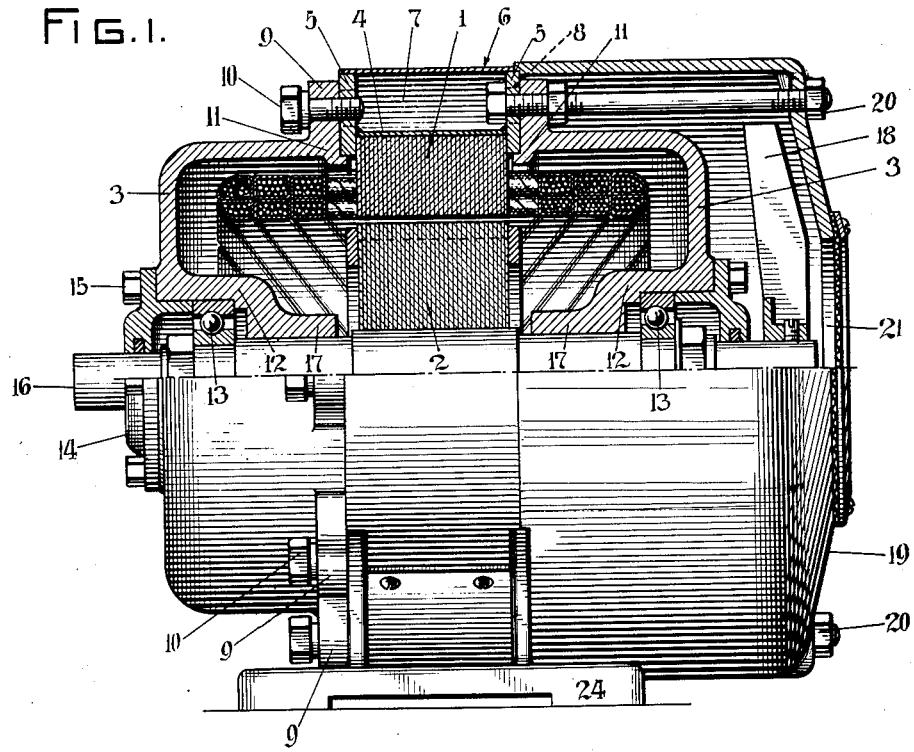

Aug. 29, 1933.    H. L. SMITH    1,924,135

DYNAMO ELECTRIC MACHINE

Filed March 28, 1931

Inventor:
Harold L. Smith,
By _____
Attorney.

Patented Aug. 29, 1933

1,924,135

UNITED STATES PATENT OFFICE 1,924,135

DYNAMO-ELECTRIC MACHINE

Harold L. Smith, Milwaukee, Wis., assignor to The Louis Allis Company, Milwaukee, Wis., a Corporation of Wisconsin Application March 28, 1931. Serial No. 526,052

9 Claims. (Cl. 172—36)

The invention relates to a dynamo electric machine.

The dynamo electric machine in which the present invention is employed is a modification of the invention described and claimed in copending application Serial No. 361,767, filed by the same applicant May 9, 1929, and issuing into Patent No. 1,799,071 upon March 31, 1931.

The invention has as its object to provide a dynamo electric machine which is simple and compact and which may be readily manufactured.

Another object is to provide a simple and efficient stator to which a removable end plate may be readily fastened upon each end thereof.

Another object is to facilitate providing the stator with a closed inner casing and an open outer casing.

According to the present invention as ordinarily practiced, the stator is provided with a laminated core having an apertured end ring arranged upon each end thereof to carry an outer casing arranged around the core to provide a passage for external air over the core, and a removable end plate is fastened to each end ring.

The dynamo electric machine which is hereinafter described and shown in the accompanying drawing is an induction motor in which the invention is embodied.

The views in the drawing are as follows:—

Figure 2:
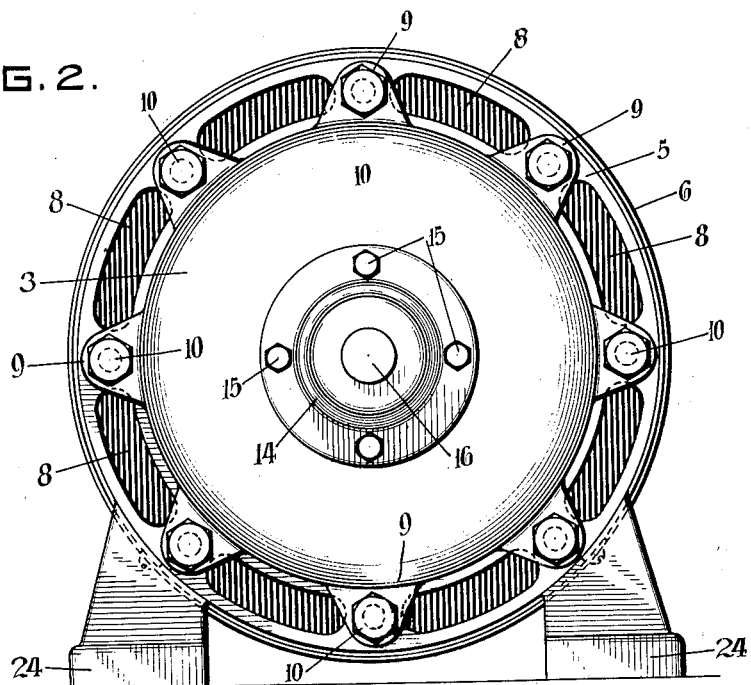

Fig. 1 is a front sectional view of the motor.
Fig. 2 is an end view thereof.

The motor is provided with a stator having a laminated core 1 carrying a primary winding and a rotor having a laminated core 2 arranged within the stator core and carrying a secondary winding.

The stator has arranged upon each end thereof a removable closed end plate 3 to form therewith a closed inner casing having sufficient strength to resist and confine a gaseous explosion within its interior.

The stator core has its laminations arranged within a heat conducting shell 4 or other casing exposed to external air.

The laminations are arranged in engagement with the shell and the heat is dissipated therefrom by direct metallic conduction to external air.

The laminations are bound together by an end ring 5 arranged upon each end thereof and welded or otherwise fastened to the shell.

The end rings 5 extend radially outward beyond the heat dissipating surface of the core and carry upon the outer peripheries thereof an outer casing 6 which provides a ventilating passage 7 for conducting external air over the core.

The end rings are provided with apertures or openings 8 arranged between the inner and outer casings.

The end plate is provided around the outer periphery thereof with lugs 9 which are fastened by bolts 10 to the end ring intermediate the openings 8.

The bolts 10 allow either end plate to be readily removed without disturbing the other end plate.

The inner end of each end plate abuts the outer end of its end ring and it has formed thereon an inward and outward flange 11 extending around and in contact with the end ring to form therewith an elongated joint between the end plate and the stator.

The elongated joint thus formed between the end plate and the stator has sufficient length to quench ignited or exploded gas from within the inner casing before it reaches the exterior thereof.

The end plate has a socket 12 formed therein, and a ball bearing 13 secured in position within the socket by a removable cap 14 which is fastened to the end plate by bolts 15.

The bearings 13 support a shaft 16 upon which the rotor 2 is secured.

Each end plate has formed thereon apart from the bearing for the shaft a central sleeve 17 extending over and around the shaft to form an elongated joint between the end plate and the shaft.

The elongated joint thus formed between the end plate and the shaft has sufficient length to quench ignited or exploded gas from within the inner casing before it reaches the exterior thereof.

The shaft 16 carries upon one end thereof a fan 18 for forcing air through the openings 8 and passageway 7.

The fan 18 is arranged within an end casing 19 which is carried by one of the end rings and fastened in position thereon by two or more long bolts 20.

The end casing has an axial inlet opening 21 through which the fan draws external air and forces it through the openings in one end ring into the passage 7, over the heat dissipating surface of the stator core and out of the passage 7 through the openings in the other end ring.

The stator is carried and supported upon a base 24 by the core 1 being mounted thereon in any suitable way.

The motor which has been explained has high capacity and efficiency for a given size core and given over-all dimensions, even though it is enclosed within a closed inner casing, as its core dissipates its heat at a high rate by direct metallic conduction to external air.

The invention herein set forth is susceptible of various modifications within the scope of the appended claims.

The invention which has been shown and described is hereby claimed as follows:

1. A dynamo electric machine, comprising a stator having a laminated core, an outer casing arranged around said core and spaced therefrom to provide a passage for external air over said core, an end ring arranged upon each end of said core and extending beyond the outside thereof to support said outer casing and provided with openings for circulation of outside air through said passage, an end plate arranged upon each end ring, means to fasten said end plates in position, a rotor arranged within said stator and having its shaft bearing in said end plates, an end casing arranged at one end of said outer casing, and a fan arranged in said end casing and driven by said shaft to cause external air to pass through said passage.

2. A dynamo electric machine, comprising a stator having a laminated core, an outer casing arranged around said core and spaced therefrom to provide a passage for external air over said core, an end ring arranged upon each end of said core and extending beyond the outside thereof to support said outer casing and provided with openings for circulation of outside air through said passage, a binding arranged across the outer periphery of said core in contact therewith and fastened to said end rings, an end plate arranged upon each end ring, means to fasten said end plates in position, a rotor arranged within said stator and having its shaft bearing in said end plates, an end casing arranged at one end of said outer casing, and a fan arranged in said end casing and driven by said shaft to cause external air to pass through said passage.

3. A dynamo electric machine, comprising a stator having a laminated core, an outer casing arranged around said core and spaced therefrom to provide a passage for external air over said core, an end ring arranged upon each end of said core and extending beyond the outside thereof to support said outer casing and provided with openings for circulation of outside air through said passage, a thin metallic shell arranged across the outer periphery of said core in contact therewith and fastened to said end rings, an end plate arranged upon each end ring, means to fasten said end plates in position, a rotor arranged within said stator and having its shaft bearing in said end plates, an end casing arranged at one end of said outer casing, and a fan arranged in said end casing and driven by said shaft to cause external air to pass through said passage.

4. A dynamo electric machine, comprising a stator having a laminated core, an outer casing arranged around said core and spaced therefrom to provide a passage for external air over said core, an end ring arranged upon each end of said core and extending beyond the outside thereof to support said outer casing and provided with openings for circulation of outside air through said passage, a thin cylindrical shell arranged around said core in contact with the outside thereof and fastened to said end rings, an end plate arranged upon each end ring, means to fasten said end plates in position, a rotor arranged within said stator and having its shaft bearing in said end plates, an end casing arranged at one end of said outer casing, and a fan arranged in said end casing and driven by said shaft to cause external air to pass through said passage.

5. A dynamo electric machine, comprising a stator having a laminated core, an outer casing arranged around said core and spaced therefrom to provide a passage for external air over said core, an end ring arranged upon each end of said core and extending beyond the outside thereof to support said outer casing and provided with openings for circulation of outside air through said passage, a closed end plate arranged upon each end ring and having a flange engaging said end ring and forming therewith an elongated joint of sufficient length to quench ignited or exploded gas from within the interior of said machine before it reaches the outside thereof, means to fasten said end plates in position, a rotor arranged within said stator and having its shaft bearing in said end plates, an elongated sleeve carried by said end plates and arranged around said shaft to form therewith an elongated joint having sufficient length to quench ignited or exploded gas from within said machine before it reaches the outside thereof, an end casing arranged at one end of said outer casing, and a fan arranged in said end casing and driven by said shaft to cause external air to pass through said passage.

6. A dynamo electric machine, comprising a stator having a laminated core, an outer casing arranged around said core and spaced therefrom to provide a passage for external air over said core, an end ring arranged upon each end of said core and extending beyond the outside thereof to support said outer casing and provided with openings for circulation of outside air through said passage, an end plate arranged upon each end ring, lugs carried by said end plate, bolts passing through said lugs and connected to said end ring intermediate said openings, a rotor arranged within said stator and having its shaft bearing in said end plates, an end casing arranged at one end of said outer casing, and a fan arranged in said end casing and driven by said shaft to cause external air to pass through said passage.

7. A dynamo electric machine, comprising a stator having a laminated core, an outer casing arranged around said core and spaced therefrom to provide a passage for external air over said core, an end ring arranged upon each end of said core and extending beyond the outside thereof to support said outer casing and provided with openings for circulation of outside air through said passage, a shell arranged across the outer periphery of said core in contact therewith and fastened to said end rings, a closed end plate arranged upon each end ring and having a flange engaging said end ring and forming therewith an elongated joint of sufficient length to quench ignited or exploded gas from within the interior of the machine before it reaches the outside thereof, means to fasten said end plates in position, a rotor arranged within said stator and having its shaft bearing in said end plates, an elongated sleeve carried by said end plate and arranged around said shaft to form therewith an elongated joint having sufficient length to quench ignited or exploded gas from within said machine before it reaches the outside thereof, an end casing arranged at one end of said outer casing, and a fan arranged in said end casing and driven by said shaft to cause external air to pass through said passage.

8. A dynamo electric machine, comprising a stator having a laminated core, an outer casing arranged around said core and spaced therefrom to provide a passage for external air over said core, an end ring arranged upon each end of said core and extending beyond the outside thereof to support said outer casing and provided with openings for circulation of outside air through said passage, a thin cylindrical shell arranged around said stator core in contact therewith and welded to said end rings, a closed end plate arranged upon each end ring and having a flange engaging said end ring and forming therewith an elongated joint of sufficient length to quench ignited or exploded gas from within the interior of the machine before it reaches the outside thereof, means to fasten said end plates in position, a rotor arranged within said stator and having its shaft bearings in said end plates, an elongated sleeve carried by said end plate and arranged around said shaft to form therewith an elongated joint having sufficient length to quench ignited or exploded gas from within said machine before it reaches the outside thereof, an end casing arranged at one end of said outer casing, and a fan arranged in said end casing and driven by said shaft to cause external air to pass through said passage.

9. A dynamo electric machine, comprising a stator provided with a laminated core, an end plate arranged upon each end of said stator and forming in part a closed inner casing having sufficient strength to resist a gaseous explosion within its interior, a rotor arranged in said stator and having a shaft bearing in each end plate, joints formed between each end plate and said stator and between each end plate and said shaft to quench ignited gas from within said inner casing before it reaches the outside thereof, a flat end ring of substantial depth engaging each end of said core and having apertures formed therein beyond the outside of said core, means connecting said end rings to each other to retain said core in position therebetween, an outer casing carried by said end rings upon the outer edges thereof and enclosing a ventilating passage for external air, an end casing arranged at one end of said inner casing in communication with said ventilating passage and carried by one of said end rings, and a fan arranged in said end casing and driven by said shaft to cause external air to flow through said ventilating passage.

HAROLD L. SMITH.